(12) United States Patent
Delhom Munoz (10) Patent No.: US 11,866,960 B2
(45) Date of Patent: Jan. 9, 2024

(54) CONFIGURABLE SAFETY DEVICE AND PROCEDURE FOR ITS CONFIGURATION

(71) Applicant: Legutec Iniciativas Tecnicas, S.L., Valencia Naquera (ES)

(72) Inventor: Salvador Gabriel Delhom Munoz, Valencia (ES)

(73) Assignee: LEGUTEC INICIATIVAS TECNICAS, S.L., Naquera (ES)

( * ) Notice: Subject to any disclaimer, the term of this patent is extended or adjusted under 35 U.S.C. 154(b) by 348 days.

(21) Appl. No.: 17/054,228

(22) PCT Filed: May 28, 2019

(86) PCT No.: PCT/EP2019/063891
§ 371 (c)(1),
(2) Date: Nov. 10, 2020

(87) PCT Pub. No.: WO2019/229098
PCT Pub. Date: Dec. 5, 2019

(65) Prior Publication Data
US 2021/0238891 A1    Aug. 5, 2021

(30) Foreign Application Priority Data

May 30, 2018 (ES) ............................... ES201830515

(51) Int. Cl.
*E05B 67/00* (2006.01)
*B62H 5/00* (2006.01)
(Continued)

(52) U.S. Cl.
CPC ........... *E05B 67/003* (2013.01); *B62H 5/003* (2013.01); *E05B 71/00* (2013.01); *E05B 73/0005* (2013.01); *F16G 15/04* (2013.01)

(58) Field of Classification Search
CPC ........ E05B 67/003; E05B 71/00; E05B 73/00; E05B 73/0005; E05B 73/007; E05B 73/0082; B62H 5/003
See application file for complete search history.

(56) References Cited

U.S. PATENT DOCUMENTS

| | | | | |
|---|---|---|---|---|
| 1,539,301 A | * | 5/1925 | Cooper | E05B 67/003 70/53 |
| 1,545,660 A | * | 7/1925 | Johnson | E05B 69/003 70/49 |

(Continued)

FOREIGN PATENT DOCUMENTS

EP    1944440    7/2008

OTHER PUBLICATIONS

Written Opinion of the International Searching Authority filed in PCT/EP2019/063891 dated Aug. 7, 2019, 5 pages.
(Continued)

*Primary Examiner* — Christopher J Boswell
(74) *Attorney, Agent, or Firm* — Vedder Price P.C.

(57) ABSTRACT

Configurable safety device comprising a main branch which, in turn, comprises a cable delimited by a flashing and a steering lock, with a series of rings and anchorage clamps of complementary geometries arranged on the cable in such a way that, in the locked position, all these elements are closely joined and the anchorage clamps are blocked without the possibility of opening, while in the unlocked position, spaces are generated between the elements, anchorage clamps and rings, allowing the opening of these anchorage clamps. The passage from the closed to the unlocked position is obtained by increasing the available cable extension, and the passage from the unlocked to the locked position by decreasing it. For this purpose, the steering lock has the
(Continued)

means to increase or decrease this extension of available cable as well as a latch to fix it.

20 Claims, 7 Drawing Sheets

(51) Int. Cl.
*E05B 71/00* (2006.01)
*E05B 73/00* (2006.01)
*F16G 15/04* (2006.01)

(56) References Cited

U.S. PATENT DOCUMENTS

| | | | | |
|---|---|---|---|---|
| 3,696,647 A | * | 10/1972 | Balicki | E05B 67/003 |
| | | | | 70/49 |
| 3,765,196 A | * | 10/1973 | Balicki | E05B 67/003 |
| | | | | 70/49 |
| 3,933,015 A | * | 1/1976 | Balicki | E05B 67/003 |
| | | | | 70/49 |
| 5,274,353 A | * | 12/1993 | Bianchi | E05B 67/003 |
| | | | | 340/568.1 |
| 5,937,678 A | * | 8/1999 | Kuo | B62H 5/003 |
| | | | | 70/49 |
| 8,429,940 B2 | * | 4/2013 | Evans | E05B 67/003 |
| | | | | 70/52 |
| 9,243,428 B1 | | 1/2016 | Miracle | |
| 9,506,274 B1 | * | 11/2016 | Miracle | E05B 71/00 |
| 10,196,837 B2 | * | 2/2019 | Holmes | E05B 71/00 |
| 2005/0183475 A1 | * | 8/2005 | Liu | E05B 67/003 |
| | | | | 70/53 |
| 2005/0262904 A1 | | 12/2005 | Ling | |

OTHER PUBLICATIONS

International Search Report filed in PCT/EP2019/063891 dated Aug. 7, 2019, 3 pages.

* cited by examiner

CONFIGURABLE SAFETY DEVICE AND PROCEDURE FOR ITS CONFIGURATION

As its name indicates, the invention refers to a safety device comprising a flexible body capable of bending into a loop and anchorage systems, customarily used to safeguard bicycles or other light vehicles, which closes on itself, comprising an element which allows the simple configuration of such a device at the will of the user through a procedure which is also claimed. The device is configurable in terms of the location of the anchorage points, and in terms of the connection of different devices in the form of branches. Another advantage is that no matter how many anchorage points or branches there are, their locking or unlocking is governed by a single lock, all without reducing the safety and robustness of the set.

It is for this reason that this device and the procedure that is also claimed are very versatile, being able to be applied in many different sectors, including security against theft, securing loads in transport, or securing people for example in vehicles, etc.

It belongs to the safety devices technical area.

BACKGROUND OF THE INVENTION

To avoid the risk of theft, it is common to use security elements, usually chains closed by a padlock, which immobilise an object or tie it to another fixed object preventing its movement or theft.

This is very common in the field of light vehicles such as bicycles or mopeds, and is also common in many other fields such as displays, for example of jewellery, door closures, exterior security blinds, terrace furniture or building elements among others.

Other sectors that also use anchors are those related to personal safety, amusement park rides or transport vehicles, where it is also often necessary to fix loads to avoid their displacement.

The use of chains of links with a padlock is very widespread because of the versatility of being able to anchor the padlock in any link of the chain by tightening the tie to a greater or lesser extent.

However, due to their link configuration, chains are relatively easy to break and, moreover, they do not allow a series of anchors arranged at a distance from each other to be unlocked from a single lock.

To improve safety, other types of devices appeared, colloquially known as pythons, with articulated tubular bodies based on the combination of the tensile strength of a metallic cable with the additional resistance provided by a metallic shield, as shown in the Spanish utility model ES296085.

These devices, although they surpassed conventional chains in terms of resistance, were not very versatile as they did not allow the object to be tightened to a greater or lesser extent because the length was predetermined and also the location of the anchors, male and female, at opposite ends of the tubular body.

Depending on the uses, it is interesting to be able to tie two or more separate objects with a single device, forming two loops, e.g., the two wheels of a bicycle or a wheel and the frame, etc.

U.S. Pat. No. 9,243,428 refers to a safety device that incorporates a ring at one end, another free ring that runs through the tubular body and incorporates a lock, and a lock at the free end of the tubular body such that the end comprising the ring can form a loop by passing the opposite end through the ring while the end comprising a lock will form a loop when anchored to the free ring lock. This system, although versatile, has weak points such as the rings that make it unsafe. On the other hand, it does not allow the formation of branches in a simple way, and so its use is limited.

U.S. Pat. No. 7,131,298 refers to a multiple lock to which several branches can be anchored. These branches cannot have other branches, but rather their functionality is limited to generating a loop thanks to an existing ring or loop at one of its ends and through which the filiform element passes. Its versatility is limited because it does not support more configurations other than the embodiment of the said loop, and all the branches must come together in a central lock with a limited number of anchors.

Patent ES2329322 indicates a safety device that brings together two tubular bodies connectible to each other where one is intended to immobilise a vehicle while the other, attached to the previous one, supports being attached to a fixed element. The patent does not include any option other than that to configure the device by joining both in order to fulfil said function.

The object of utility model ES1055796U is a safety device formed by a series of tubular rings with a male base and a female base in such a way that the male base of one is inserted into the female base of the following one as a ball-and-socket joint allowing a certain bending of the set. This register also indicates the incorporation of a shell that surrounds each of these tubular elements. This device does not support being configured, as its length and the places of the anchors are predetermined. On the other hand the rings that constitute it differ in essential elements from the rings of the invention object of the present patent.

The object of utility model ES1107206U is a safety device made up of different tubes of two different sizes in which the smallest can hide within the largest, the whole set being crossed by a tensioning cable that allows the device to extend and, subsequently, forces its retraction. The technical solution of this device does not allow the free configuration of the anchorage points.

None of the indicated files allows the free configuration of the anchorage points nor the union of several branches, each one of them joined to the main one in a different point, all this with a maximum resistance and security and involving unlocking and locking governed from a single point.

DESCRIPTION OF THE INVENTION

In order to overcome the problems and limitations described, the applicant is proposing the present invention, the object of which is a safety device that is configurable through the action of a series of elements that it comprises, and that allow a procedure to be carried out for its configuration.

The device can be configured both in terms of its structure, joining branches, and the choice of location of anchorage points, all in a simple way and governed by a single lock, in such a way that the single lock can lock or unlock the entire structure, including possible branches.

The safety device is of the articulated tubular type, suitable for grasping one or more objects by immobilising them or attaching them to a fixed element to prevent their movement or subtraction.

The device comprises at least one main branch which in turn comprises:
  An articulated tubular body comprising a series of related rings.
  A cable that runs through such rings.

A steering lock with a latch, preferably an interior latch.

At least one anchorage clamp.

A final flashing.

We will call each one of the segments a ring, preferably cylindrical, of which the tubular body is comprised. These rings have a male base and a female base and are arranged, crossed by the cable, in such a way that the male base of one matches with the female base of the next, and so on.

We will call the filiform body that unifies the rings, crossing them by their interior part, a cable. This cable is resistant to traction and has adequate dimensions and roughness so that the rings can, if necessary, slide over it.

We will call the extension cable suitable to be occupied by the rings and anchorage clamp(s) the cable available, which will have both a maximum available extension position and a minimum available extension position.

We will call the element capable of increasing or reducing the available cable extension and fixing its position the steering lock. In a possible embodiment, the steering lock comprises a casing and a piston which move relative to each other, and a latch which fixes the available cable position by fixing the relative position of casing and piston.

The variations of the available cable extension can occur, in the case of the reduction, because the piston stretches the cable by hiding part of it inside the casing without reducing the available cable extension or because the piston slides over the cable occupying part of the available cable extension. The effect achieved is to have a greater or lesser extension of cable available for the rings and the anchorage clamp(s).

We will call any means, whether physical, mechanical, electrical, magnetic or any other type capable of fixing the extension cable available, a latch. In a possible execution the fixation of the available cable extension will be provided by retaining the relative movement between the casing and the piston fixing the position of one in relation to the other.

We will call the latch that includes a security filter such as a light bulb with key, a code, a password or any other system or device that guarantees that only the user can manipulate it the internal latch.

We will call the element that comprises two opposing bodies that by default tend to join the anchorage clamp. The geometry of both bodies is adequate to grasp the cable between them, with this anchorage clamp being perpendicular to the cable and between two contiguous elements. The anchorage clamp comprises a male side and a female side in such a way that the female side of the anchorage clamp is faced with the male element of one of the contiguous elements and the male side of the anchorage clamp is faced with the female element of the other contiguous element. By joining the two opposing bodies comprising the anchorage clamp, a suitable mouth is formed to catch a bolt. The anchorage clamp can be relocated to the desired location on its branch.

We will call the element adjacent to the clamp by any of its sides, which can be either a ring, another clamp or a lock, and which interacts with it by blocking or unblocking its opening thanks to its complementary geometries the contiguous element.

We will call the element found at the end of the cable and joined to it the flashing. This final flashing may incorporate a bolt.

We will call each set that includes a cable, a plurality of rings, a lock and a flashing a branch. The main branch shall be the branch that includes the steering lock and the other secondary branches.

The device may or may not comprise secondary branches.

These secondary branches are attached to the main branch or to another secondary branch via anchoring in the mouths of the anchorage clamps of the branch to which they are attached.

These secondary branches comprise:

An articulated tubular body comprising a series of related secondary rings.

A secondary cable.

A secondary lock comprising a retractable coupling piece and a latch.

A secondary flashing.

Optionally, these secondary branches may also include at least one secondary anchorage clamp.

Most of the elements of the secondary branches do not differ when it comes to the form and use of the elements of the main branch, and so we refer to the definitions already made and which are valid for these elements that we will call secondary rings, secondary cable or secondary anchorage clamp to distinguish them from those of the main branch.

As far as the secondary lock is concerned, it differs from the steering lock in that the secondary lock comprises a retractable coupling piece intended, as it is forward, to be anchored to a fixed element that prevents its retraction.

This retractable coupling piece may include a bolt intended to be anchored in the mouth of a clamp of another branch, although it may include other types of geometry suitable for attachment to other elements, such as the case where it includes a through-hole opening suitable for inserting the arch of a padlock, and this secondary branch may be used independently.

The invention whose elements have been described behaves as follows.

In a possible embodiment the steering lock comprises an outer casing and a piston linked to the cable in such a way that the relative movement of said piston relative to the casing causes there to be a greater or lesser extension of cable available outside the casing.

In another possible embodiment, the extension or reduction of the available cable extension can be carried out with other mechanisms such as a spindle, gears, motors or any other, although this report explains the steering lock that includes a piston that can be moved with respect to the casing.

We will call the position of greater extension of cable available the unlocked position, and the position that leaves a smaller extension of cable available the locked position.

In a possible embodiment, when this variation of the available cable extension is caused by the piston position movement, one of the piston positions is natural and the other is forced. There is an elastic element linked to the piston that helps to return it to its natural position once released from the forced one.

In the locked position, when the available cable extension is the smallest, the rings are in close contact with each other as well as with the anchorage clamp.

In the unlocked position, when the available cable extension is the largest, some space is allowed between the rings and with the anchorage clamp.

The anchorage clamp remains locked and, if necessary, trapping the bolt in its mouth, when the contact between it and the adjacent elements is narrow, the geometries of the clamp being embedded with those of these adjacent elements.

The anchorage clamp comprises two bodies that tend to join and, in doing so, grasp the cable, with the clamp being perpendicular to the cable.

As mentioned above, the sides of the clamp have geometries that are complementary to those of the adjacent elements.

The female side of the clamp has a suitable male re-entry to be inserted into a female geometry, which we will call the female re-entry, found in the first contiguous element.

We will call any extension included in the female side of the clamp and that is inserted in the first contiguous element in such a way that this insertion blocks the opening of the clamp the male re-entry.

On the other hand, the male side of the clamp is inserted into the female geometry of the second contiguous element.

When the clamp is in close contact with its adjacent elements, its opening is blocked and a bolt, if any, is blocked by the mouth of the clamp.

When the available cable extension increases, for example due to the displacement of the steering lock piston, spaces are generated between the rings and between the anchorage clamps and their contiguous elements, allowing them to be opened.

When the anchorage clamp is opened, if necessary, the bolt trapped in its mouth is released and, in addition, it is possible to remove this anchorage clamp to place it in another point of the tubular body.

To do this, the rings must be moved along the cable until there is a sufficient gap at the point where the anchorage clamp needs to be placed, and then the anchorage clamp placed grasping the cable at that point.

In the case of the secondary branches, the behaviour is similar, although the secondary piston is connected to a retractable coupling piece in such a way that when the piston moves reducing the available secondary cable extension, the retractable coupling piece remains outside the casing on the side opposite to the secondary cable exit. When this retractable coupling piece is anchored to an element such as a clamp of another branch, as it includes a secondary bolt, or to a padlock, as said retractable part has a hole, the piston is fixed in the position of least extension of secondary cable available and the set is blocked and, where appropriate, fixed to the main branch. On the other hand, if this retractable coupling piece is released, the available secondary cable extension can reach its maximum value by allowing space between the secondary rings and between these and, where appropriate, the secondary anchorage clamps.

In a possible embodiment, two or more secondary branches comprising a hole in the retractable piece could be joined through an external element such as a padlock which, with its arch, would go through the holes of the retractable pieces of each of the branches.

The device is optionally completed with static bolts of the type that can be fixed to a bracket or any other frame and this in turn to a structure of, for example, the object to be safeguarded. This would be the case of brackets attached to the seat tube of a bicycle where such clamps incorporate a bolt that is trapped by one of the anchorage clamps.

A device such as the one described allows total versatility, allowing all the important elements of a bicycle, such as the wheels, frame and seat, to be tied together with a single lock.

The procedure for configuring the safety device, starting from a lock position, comprises the following steps:

An unlocking stage in which the available cable extension is increased, e.g. by moving the piston inside the casing.

A release stage of the clamp(s) with respect to the contiguous elements, dislodging the geometries of the former with respect to the latter.

A removal stage of the clamp(s) by separating the bodies they comprise and extracting the clamp from its position in the set.

A new hole generation stage for the relocation of the clamp(s), which is achieved by moving the rings and other elements, if necessary, along the available cable and grouping them together until a sufficient free space of available cable is obtained to locate the clamp.

A placement stage of the clamp in the new hole opened in the cable available. The clamp is located by grasping the segment that can be visibly seen on the available cable and perpendicular to it.

A blocking stage reducing the amount of cable available which is obtained, for example, by displacing the piston in the opposite direction to the displacement of the first stage.

For a better understanding of the above, the following figures are provided.

BRIEF DESCRIPTION OF THE FIGURES

The same movement of the piston with respect to the casing, and the fixation thereof by the inner latch governed by the bulb allow 2 or more rings to be masked, or not, inside the casing, in such a way that the cable presents a maximum or minimum quantity of cable available in both sections. For this purpose, one of the side extensions of the casing corresponds to section 2 of the main branch, a section (36) and an opening (37) with a section greater than the maximum section of the rings, thus allowing the rings to occupy the inside of the casing at one point in the cycle.

As the piston moves inside the casing, it occupies or partially releases the cable, thus varying the available extension of the cable and expelling or masking the rings.

DESCRIPTION OF AN EMBODIMENT OF THE INVENTION

Below an embodiment of the invention is described which is not the only possible option, but merely explanatory.

The invention refers to a configurable safety device and the procedure for its configuration.

The ends to be easily configured by the user in a device such as that which is the object of this patent are the location of the anchorage clamps (3) in the main branch as well as, where appropriate, the secondary anchorage clamps (41) in the secondary branch (34), and also the number and location of the secondary branches with the advantage of all being governed by a single steering lock (4) that blocks or unblocks the set.

Below, a simple device is explained that only has one main branch, as the mechanics are very similar in the secondary branches as explained above.

For this purpose the device comprises a main branch (1) which in turn comprises:
An articulated tubular body comprising a series of related rings (11).
A cable (10) passing through such rings.
A steering lock (4) with a latch, preferably an interior latch.
Two anchorage clamps (3).
A final flashing (5) with a bolt (39).
A static bolt (28) attached to a bracket (29)

Figure 4:
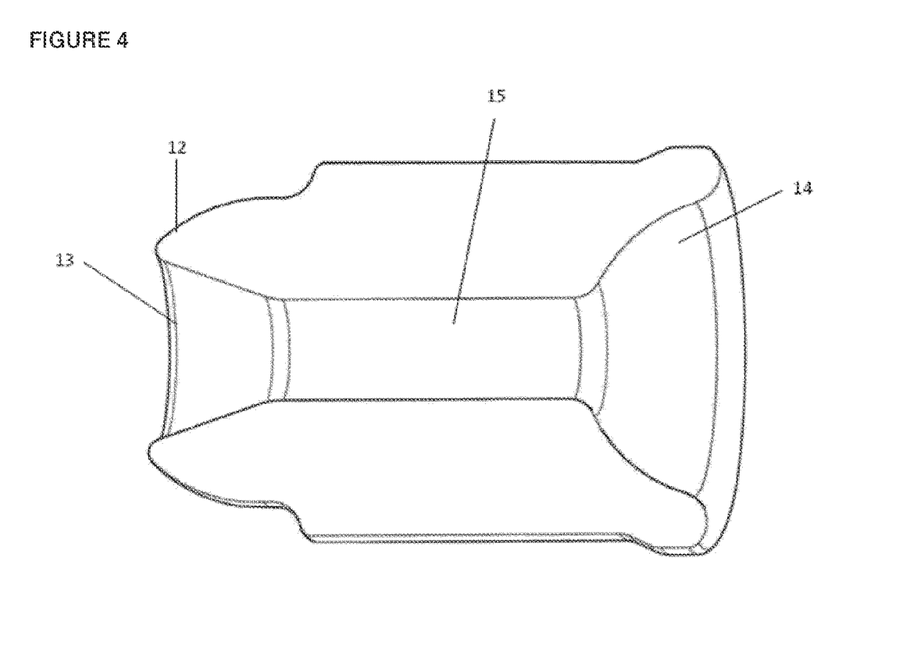
FIG. 4 shows a detailed view of the section of a ring, with the following being observed: The male base (12) with female re-entry (13), female base (14) and through channel (15) suitable for housing the cable and for it to slide through the channel.

The tubular body consists of a series of rings (11) that constitute the segments of said tubular body. The rings (11) have a cylindrical main body with a female base (14) and a male base (12) incorporating a female re-entry (13).

The rings (11) include a through channel (15) suitable to be passed through by the cable (10) which supports the set and at the same time allows the sliding of the rings, taking the cable as axis. The cable is a flexible filiform body, and resistant to traction, such as a braided steel cable.

Figure 1:
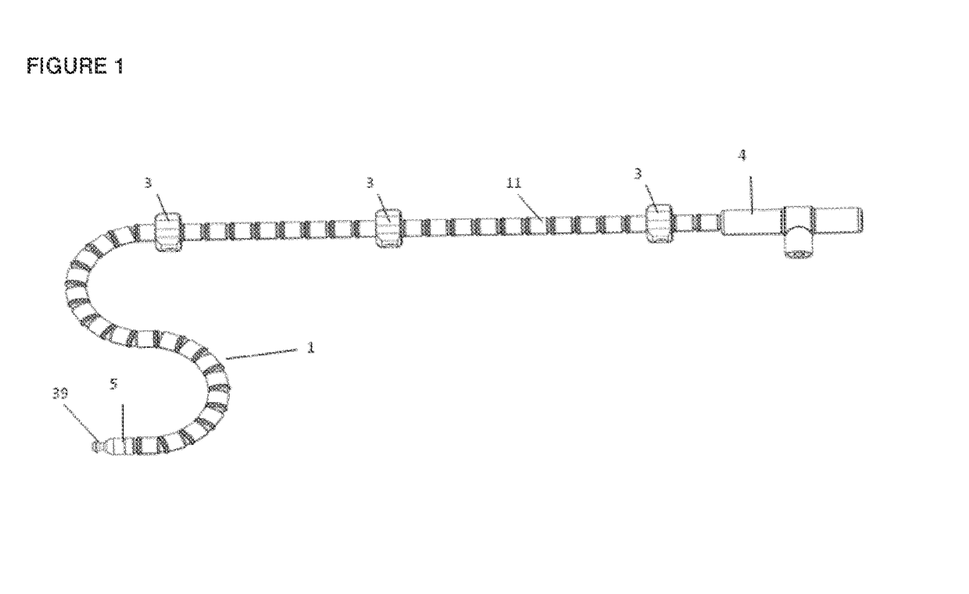
FIG. 1 represents a device like the one described, in this case comprised only of a main branch (1) in which the flexible tubular body is formed by rings (11) and with a plurality of anchorage clamps (3) inserted between the rings and in close contact with them, and the steering lock (4) and the flashing (5), in this case with a bolt (39) at the end, can be found at the ends of the main branch.
Figure 2:
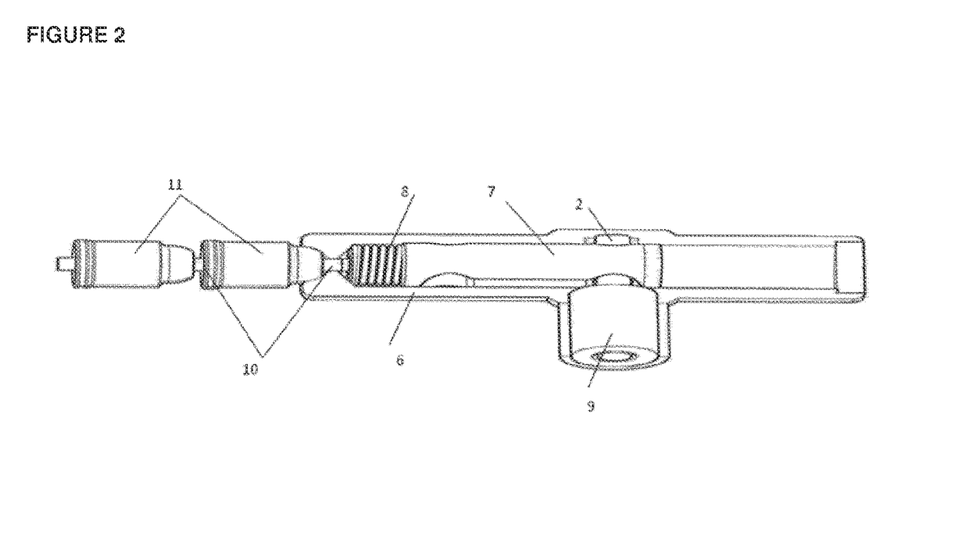
FIG. 2 shows a detailed section of the steering lock comprising a casing (6) and a piston (7) with relative movement between them, in this case in the unlocked position showing the casing (6), the piston (7) in the forced position, with the bulb (9), the inner latch (2), the cable (10) and the rings (11) linked to the elastic element (8) which is contracted As the cable is at its maximum available extension due to the position of the piston, secured by the inner latch, the rings are loosely interlocked.

The cable is connected at one end to the steering lock (4), specifically to a displaceable piston (7) inside the casing (6) and at the other end to the flashing (5), which in this case incorporates a bolt (39).

The rings (11) and the anchorage clamps (3) are mounted on the cable

Figure 3:
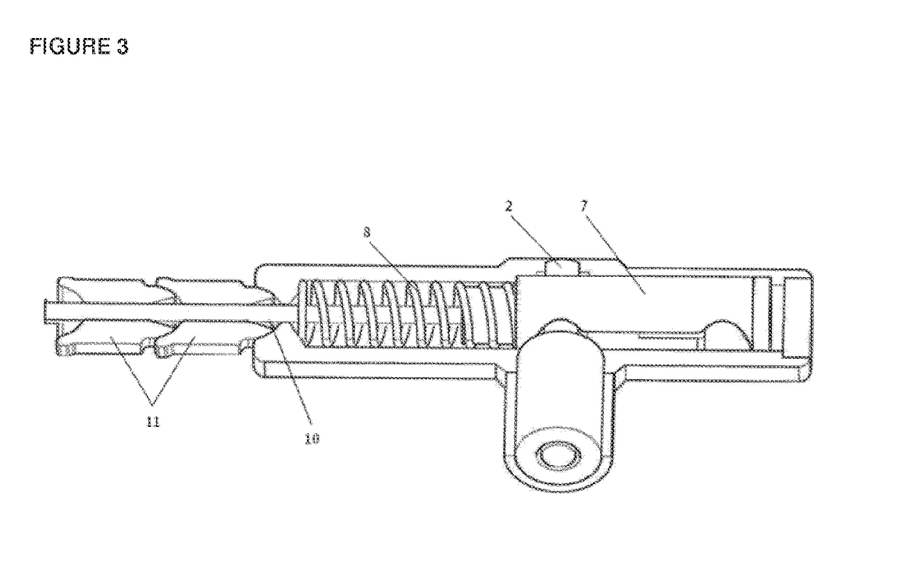
FIG. 3 shows a detailed section of the steering lock, although in this case in a locked position, reflecting how the elastic element (8) is expanded and the piston (7) is in its natural position and fixed by the inner latch (2), having dragged the cable (10) in its displacement, in such a way that the rings, which are now seen in a section view, have been closely joined, with no space between them.

Depending on the position of the piston in relation to the casing, the available cable extension for the rings and clamps varies. In their maximum available extension or unlocked position, the rings and clamps are positioned loosely in the device, while in the minimum available cable extension position, the anchorage rings and clamps are closely linked.

Figure 5:
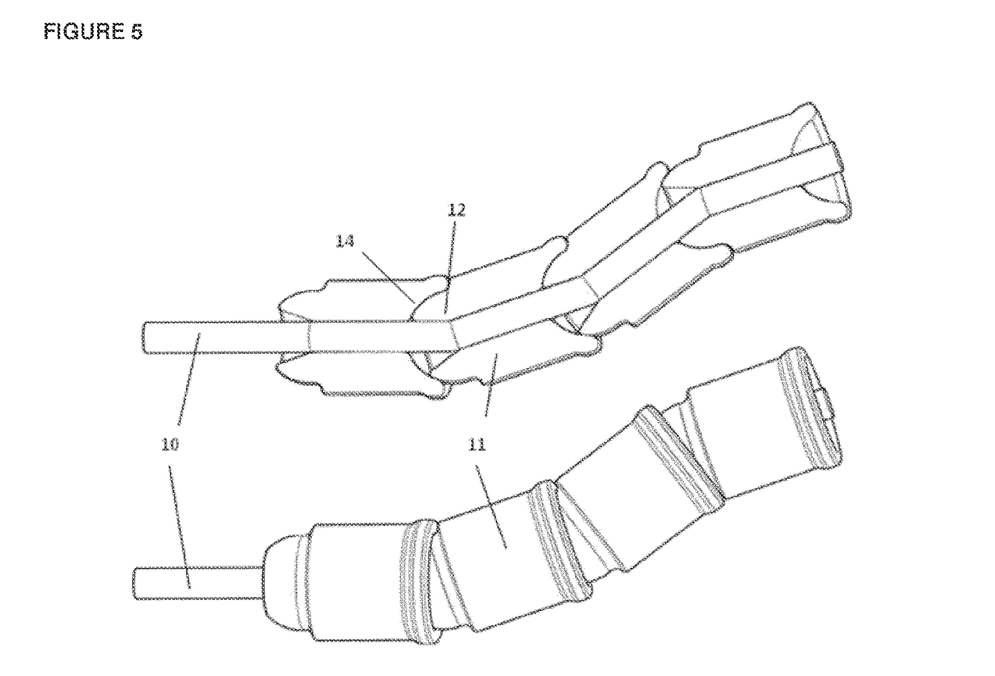
FIG. 5 shows a section and side view of the arrangement of the rings (11) and the cable (10) in close contact, with the male base (12) of each ring inserted as a ball-and-socket joint in the female base (14) of the next ring. The geometry of the rings itself acts as a ball-and-socket joint and a stop for the link between the rings.

The rings (11) are all arranged in the same direction along the cable, with the male base (12) of a ring facing the female base (14) of the next one in such a way that when the available cable extension is reduced, the male base (12) is inserted into the female base (14) as a ball-and-socket joint.

The anchorage clamps (3) are placed between two rings and perpendicular to the cable.

Figure 6:
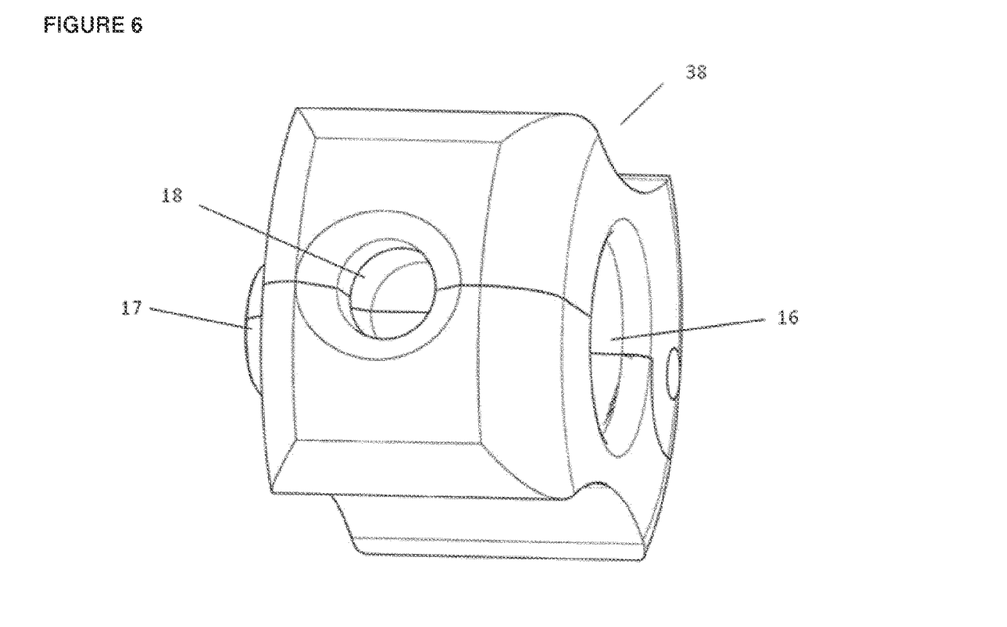
FIG. 6 shows the locked anchorage clamp (38) with its female side (16), its male side (17) and the mouth (18).
Figure 7:
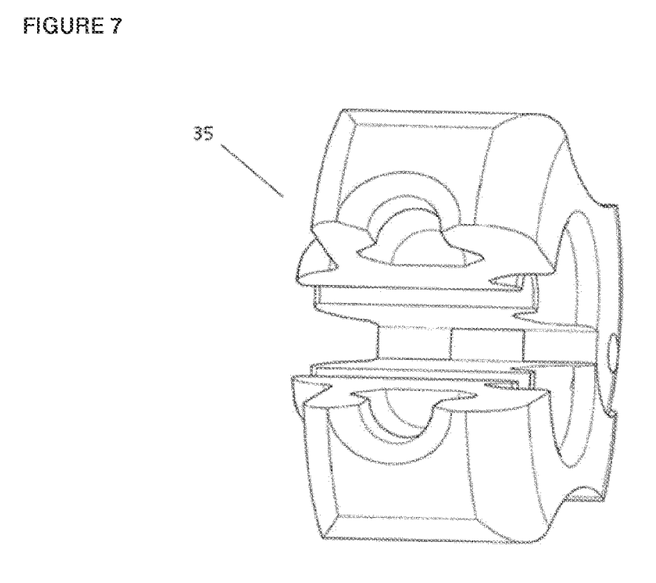
FIG. 7 shows the unlocked anchorage clamp (35).

Each anchorage clamp comprises two bodies that tend to be joined by the action of an elastic such as a spring. The anchorage clamps (3) therefore have two positions, unlocked (35) and locked (38).

When they lock onto the cable, they grasp it, perpendicular to it, and crossed on the cable.

The anchorage clamps (3) comprise a female side (16) with a male re-entry (19), a male side (17) and a mouth (18) which is formed by joining the two bodies comprising each anchorage clamp.

Figure 8:
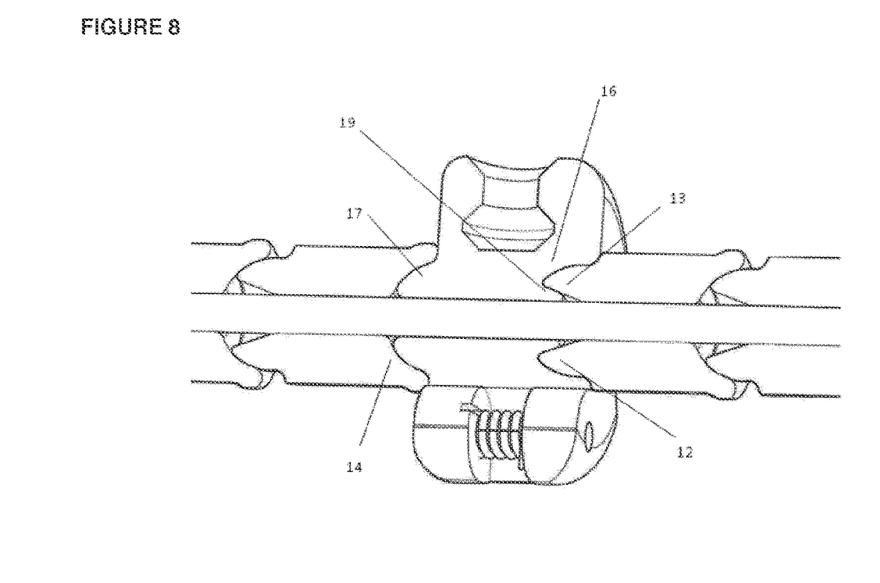
FIG. 8 shows a cut of the anchorage clamp where the female side (16) of the clamp and its male re-entry (19) can be seen embedded with the male base (12) of the previous ring and its female re-entry (13), and also the male side (17) of the clamp embedded in the female base (14) of the posterior ring. In this position, the clamp is engaged and locked, and not able to be unlocked unless the front and rear rings are disengaged and removed, which can only happen if the cable reaches its maximum available extension.

Each anchorage clamp (3) is placed on the cable (10) facing its female side (16) with the male base (12) of the previous ring and its male side (17) facing the female base (14) of the posterior ring.

With the anchorage clamp (3) between two rings (11) and locked onto the cable (10) when the available cable extension is reduced, the sides of the anchorage clamps are fitted against the bases of the adjacent rings they are facing.

When the male side (17) of the anchorage clamp is fitted to the female base (14) of the adjacent ring, this ring base acts as a stop and prevents the opening of the clamp. On the other hand, when the male re-entry (19) of the female side (16) and the female re-entry (13) of the male base (12) of the adjacent ring on the opposite side are fitted, these geometries also act as a stop preventing the opening of the clamp.

If we have inserted a bolt (39) into the anchorage clamp (3), it will be trapped until the clamp is unlocked.

Figure 9:
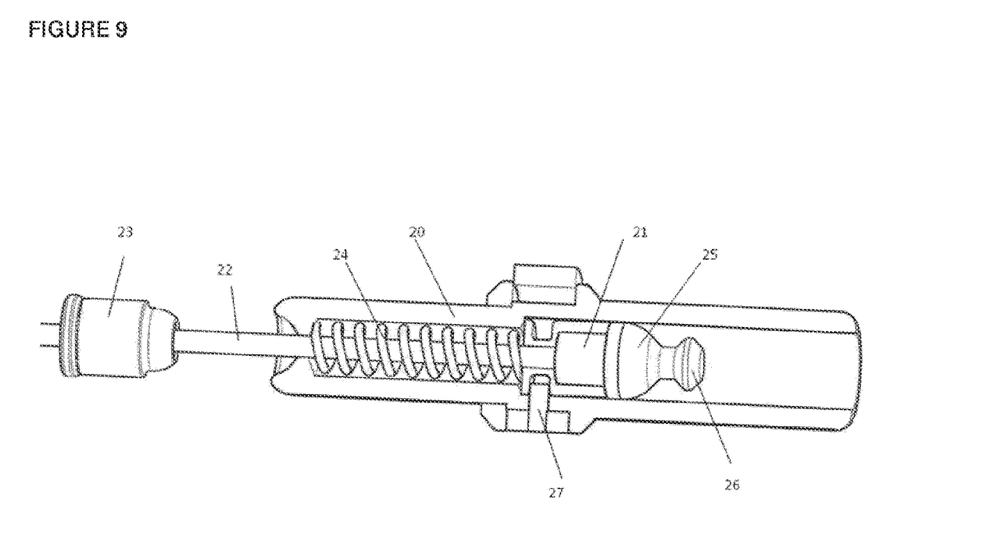
FIG. 9 shows a section view of a secondary lock, in this case in an unlocked position, and the mechanism is similar to the steering lock as it comprises a secondary casing (20), a secondary piston (21) that moves varying the extension of the secondary cable (22) available for the secondary rings (23) and, where appropriate, the secondary anchorage clamp(s) (41), a secondary elastic element (24) here compressed, and a retractable coupling piece (25), in this case comprising a secondary bolt (26) attached to the secondary piston. In order to keep the piston in the unlocked position without, for example, the coupling piece being anchored to any element, the secondary lock comprises a latch (27) which secures or releases the secondary piston.
Figure 10:
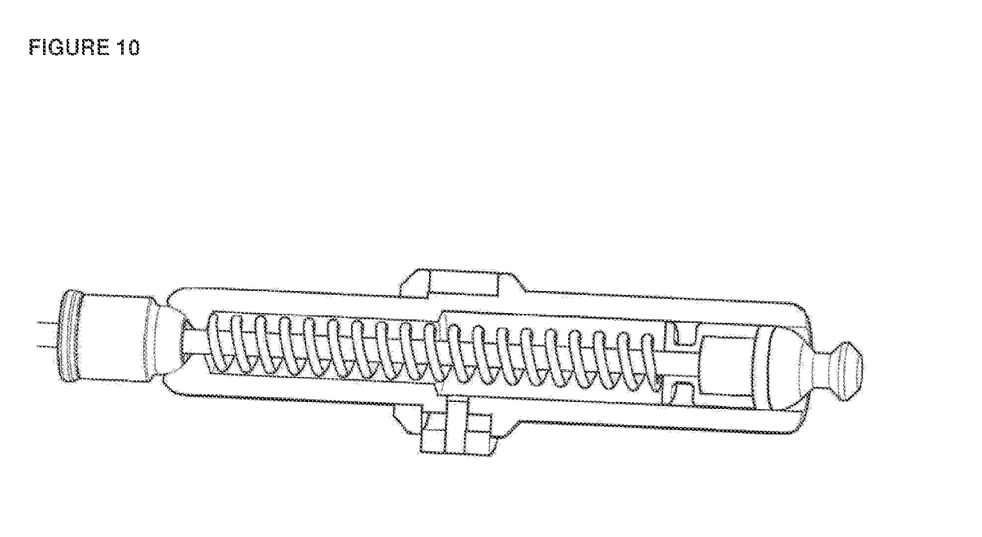
FIG. 10 shows a section view of a secondary branch lock, in this case in a locked position.
Figure 11:
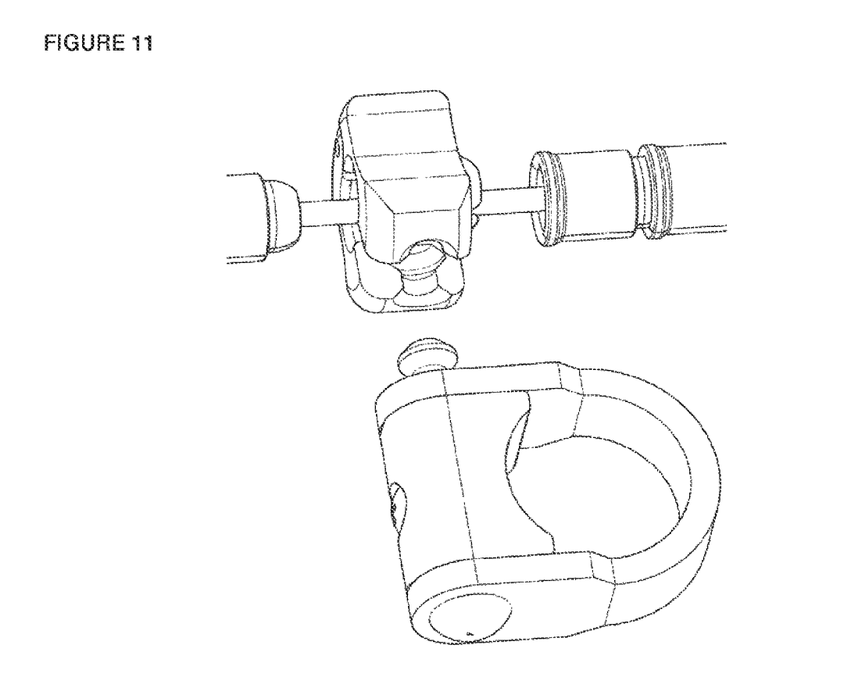
FIG. 11 shows an example of a static bolt (28), in this case a bolt attached to a bracket (29) suitable for being attached to a structure comprising a tubular section, allowing the anchorage of said bolt, and therefore of the structure to which it is attached, to any anchorage clamp.
Figure 12:
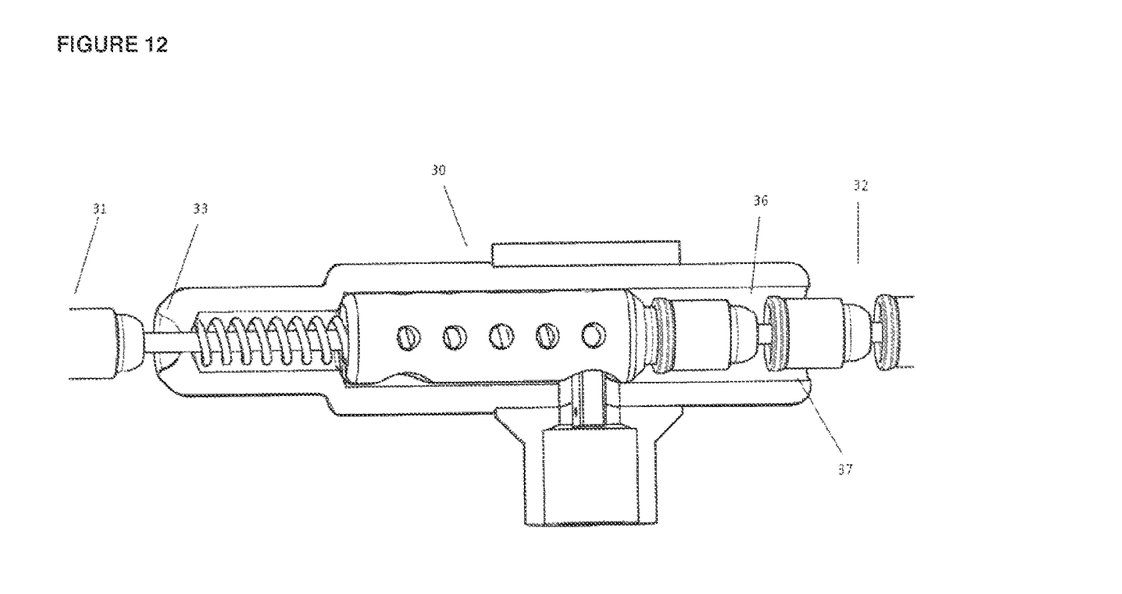
FIG. 12 shows an alternative embodiment of the steering lock that in this case is double, that is to say, is in line between a section 1 (31) and a section 2 (32) of the main branch. The figure shows the double-steering lock (30) in the unlocked position.
Figure 13:
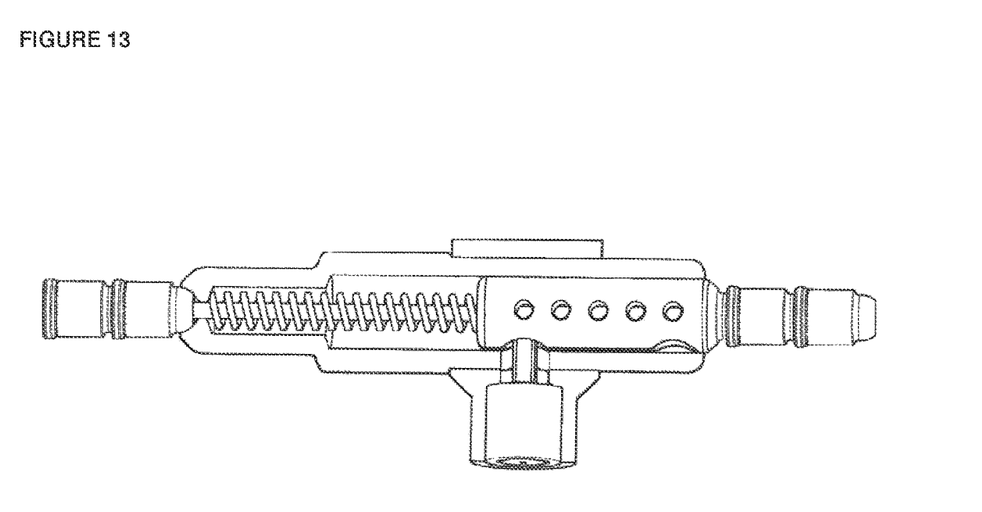
FIG. 13 shows the double-steering lock (30) in the locked position.
Figure 14:
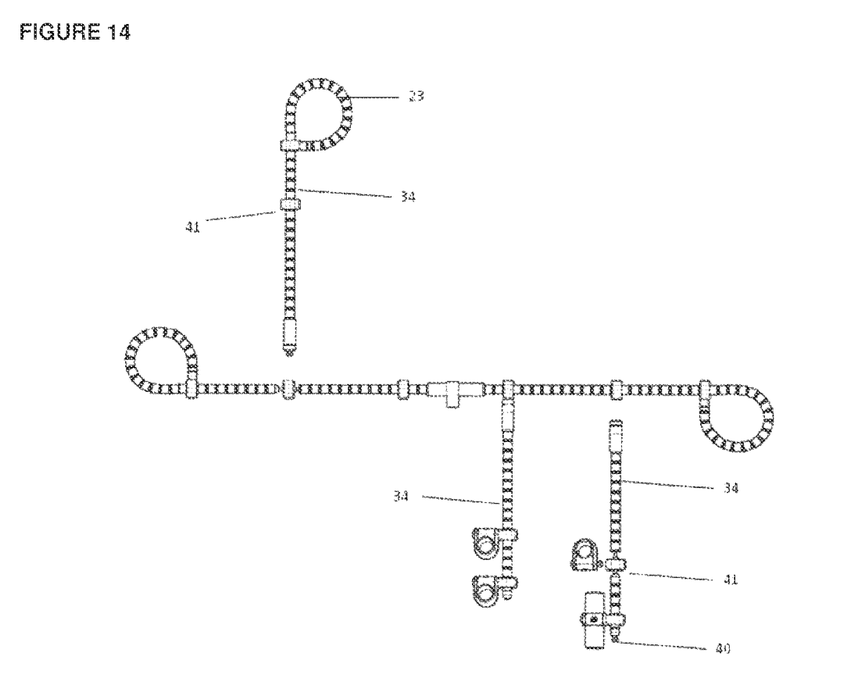
FIG. 14 shows a possible configuration of a device with a double main branch and a double-steering lock and a series of secondary branches (34) with a plurality of secondary rings (23) and clamps and a secondary flashing (40) on each of them.

If a secondary bolt (26) were to be anchored in the clamp, in the case of an embodiment with secondary branches, when the clamp is unlocked and can be opened, the secondary bolt (26) would be released.

In order to unblock the anchorage clamp (3), it is necessary to increase the available cable extension. For this purpose, the position of the piston must simply be changed by increasing the available cable extension and allowing a space between the rings and between the rings and the clamps.

The procedure for configuring the safety device, starting from a lock position, comprises the following steps:

An unlocking stage in which the available cable extension is increased by displacing the piston.

A release stage of the clamp(s) with respect to the adjacent rings, dislodging the geometries of the former with respect to the latter.

A removal stage of the clamp(s) by separating the bodies they comprise and separating them from the device.

A stage of generation of new space for the relocation of the clamp(s), which is achieved by moving the rings along the available cable and grouping them together until there is enough free cable gap available to locate the clamp.

A placement stage of the clamp in the new hole opened in the cable available. The clamp is located by grasping the exposed segment of available cable and perpendicular to it.

A blocking stage reducing the amount of cable available which is obtained by displacing the piston in the opposite direction to the displacement of the first stage.

The invention claimed is:

1. A CONFIGURABLE SAFETY DEVICE comprising:
an articulated tubular structure which comprises a cable and a plurality of rings disposed along said cable, wherein the rings are located in an available cable extension, along with a stop and a lock;
a main branch that comprises:
one or more anchorage clamp (3) perpendicular to the cable (10) and crossed by the cable, where each anchorage clamp (3) has a mouth (18), a male side (17) and a female side (16);
a plurality of rings (11) crossed by the cable where each ring has a male base (12) and a female base (14) with the rings aligned in the same direction, with the male base of one facing the female base of the next;
a male re-entry {19} at the female side (16) of each anchorage clamp and a female re-entry (13) at the male base (12) of each ring (11);
a steering lock (4) comprising a latch (2);
a flashing;
wherein each anchorage clamp is movable from an unlocked position to a locked position on the cable defining different configurations of the safety device;
wherein an available cable extension is variable from a maximum available cable extension position to a minimum available cable extension position;
where-in when disposed in the maximum available cable extension position the rings have spaces between them and are movable along the cable to define a gap at a point where one of the anchorage clamps is disposed and grips the cable; and
wherein the steering lock returns the available cable extension of the cable from the maximum available cable extension position to the minimum available cable extension position thereby fixing the disposition of the one of the anchorage clamps in close contact with the rings adjacent to the one of the anchorage clamps and preventing opening of the anchorage clamp.

2. The CONFIGURABLE SAFETY DEVICE according to claim 1 wherein the steering lock also comprises a casing (6) and a piston (7) where the piston (7) and casing (6) move relative to each other and the latch (2) blocks or releases such movement.

3. The CONFIGURABLE SAFETY DEVICE according to claim 2 wherein the steering lock comprises an elastic element (8) linked to the piston (7).

4. The CONFIGURABLE SAFETY DEVICE according to claim 2 wherein the movement of the piston with respect to the casing modifies the available cable extension.

5. The CONFIGURABLE SAFETY DEVICE according to claim 1 wherein the latch is an internal latch (2).

6. The CONFIGURABLE SAFETY DEVICE according to claim 1 wherein the flashing (5) also includes a bolt (39).

7. The CONFIGURABLE SAFETY DEVICE according to claim 1 further comprising a static bolt (28) attached to a bracket (29).

8. The CONFIGURABLE SAFETY DEVICE according to claim 1 further comprising at least one secondary branch comprising a plurality of secondary rings (23), a secondary cable (22) of variable available extension passing through the secondary rings, a secondary lock and a secondary stop (40).

9. The CONFIGURABLE SAFETY DEVICE according to claim 8 further comprising at least one secondary anchorage clamp (41).

10. The CONFIGURABLE SAFETY DEVICE according to claim 8 wherein the secondary lock comprises a secondary casing (20), a secondary piston (21) which moves by varying the available secondary cable extension (22), a secondary elastic element (24), a latch (27) and a retractable coupling piece (25).

11. The CONFIGURABLE SAFETY DEVICE according to claim 10 wherein the retractable coupling piece (25) comprises a secondary bolt (26).

12. The CONFIGURABLE SAFETY DEVICE according to claim 10 wherein the retractable coupling piece (25) comprises a hole.

13. The CONFIGURABLE SAFETY DEVICE according to claim 12 wherein one of the lateral extensions of the casing (20), that which corresponds to section 2 (32) of the main branch, has a section (36) and a mouth (37) with a greater section than the maximum section of the rings.

14. The CONFIGURABLE SAFETY DEVICE according to claim 1 wherein the steering lock is located between two sections of the main branch, a section 1 (31) and a section 2 (32).

15. The CONFIGURABLE SECURITY DEVICE according to claim 1 wherein the steering lock is at one end of the main branch.

16. A METHOD FOR THE CONFIGURATION OF A SAFETY DEVICE wherein the configuration cycle, starting from a locked position, comprises the following steps:
an unlocking stage in which an available cable extension is increased;
a release stage of a clamp(s) with respect to one or more contiguous elements, dislodging one or more geometries of the former with respect to the latter;
a removal stage of an anchorage clamp(s) by separating one or more bodies they comprise and separating them from the device;
a stage of generation of new space for the relocation of the clamp(s), which is achieved by moving one or more rings and the rest of the elements along the available cable and grouping them until a sufficient free space of exposed available cable is obtained to locate the anchorage clamp;

a placement stage of the anchorage clamp in a new hole opened in the cable available, wherein the clamp is located by grasping the exposed segment of the available cable, and perpendicular to it; and a blocking stage reducing the amount of cable available.

17. The method according to claim 16 wherein the available cable extension is increased when a piston and a cable, either main or secondary, move towards the exit of a casing.

18. The method according to claim 16 wherein the available cable extension is increased when the piston, which partially occupied the cable, moves and releases said cable space previously occupied by the set formed by the piston and the casing, allowing rings to be masked inside the casing.

19. The method according to claim 16 wherein the available cable extension is decreased by displacing the piston, either main or secondary, in a reverse manner to claim 17.

20. The method according to claim 16 wherein the available cable extension is decreased when the piston moves and partially occupies the cable, expelling the rings masked inside the casing from the casing.

* * * * *